United States Patent
Cabello

(10) Patent No.: US 6,276,265 B1
(45) Date of Patent: Aug. 21, 2001

(54) EGG POKER DEVICE

(76) Inventor: Ruth J. Cabello, 1620 Minahan Dr., Machesney Park, IL (US) 61115

(*) Notice: Subject to any disclaimer, the term of this patent is extended or adjusted under 35 U.S.C. 154(b) by 0 days.

(21) Appl. No.: 09/795,624

(22) Filed: Feb. 28, 2001

(51) Int. Cl.$^7$ ................ A23L 1/00; A23B 5/00; A47J 17/00; A47J 43/14
(52) U.S. Cl. ................ 99/568; 99/495; 99/498; 99/516; 99/538; 99/577; 99/646 R; 30/120.1
(58) Field of Search .............. 99/495–500, 516, 99/646 R, 534, 538, 578, 568, 571, 577; 30/120.1–120.5, 124, 310, 366; D7/503, 693, 695, 683

(56) References Cited

U.S. PATENT DOCUMENTS

| | | | |
|---|---|---|---|
| 691,389 | * | 1/1902 | Kendrick ................ 99/578 X |
| 1,491,908 | * | 4/1924 | Greig ................ 99/498 X |
| 2,445,490 | * | 7/1948 | Meade ................ 99/568 X |
| 2,449,941 | * | 9/1948 | Jauhiainen ................ 99/516 X |
| 3,605,833 | * | 9/1971 | Strang ................ 99/571 X |
| 3,839,792 | * | 10/1974 | Ceccon ................ 30/120.1 |
| 3,855,915 | * | 12/1974 | Hoyt et al. ................ 99/495 |
| 4,056,051 | * | 11/1977 | Brown ................ 99/516 |
| 4,117,774 | * | 10/1978 | Wilburn et al. ................ 99/568 |
| 4,149,456 | * | 4/1979 | Gisonni ................ 99/577 |
| 4,182,234 | * | 1/1980 | Reed ................ 99/495 |
| 5,297,477 | * | 3/1994 | Phillips ................ 99/568 X |
| 5,317,962 | * | 6/1994 | Phillips ................ 99/495 |

* cited by examiner

*Primary Examiner*—Timothy F. Simone
(74) *Attorney, Agent, or Firm*—David J Archer

(57) ABSTRACT

An egg poker device is disclosed for piercing a hole in a shell of an egg to be boiled to facilitate removal of the shell. The device includes a first member having a base and a wall extending away from the base such that the base and the wall define therebetween a cavity. A disc shaped spring is disposed within the cavity and adjacent to the base, the spring having a central portion. The spring also defines a peripheral edge. The first end of a rod is secured to the central portion of the spring and a second end of the rod defines a point for piercing the hole in the shell of the egg. A second member slidably cooperates with the first member. The second member includes a support for supporting the egg, the support defining a hole for the slidable passage therethrough of the point of the rod. A skirt portion extends from the support such that the skirt portion slidably cooperates with the wall. The skirt portion defines a distal end which cooperates with the peripheral edge of the spring. The arrangement is such that in operation of the device, when the egg to be boiled is supported by the support, the support and the egg supported thereon are moved towards the first member so that the distal end of the skirt is urged against the peripheral edge of the spring for flexing the spring so that the central portion of the spring and the first end of the rod secured thereto are moved towards the egg such that the point passes through the hole in the support for piercing the shell of the egg.

15 Claims, 4 Drawing Sheets

EGG POKER DEVICE

BACKGROUND OF THE INVENTION

FIELD OF THE INVENTION

The present invention relates to an egg poker device for piercing a hole in a shell of an egg.

More specifically, the present invention relates to an egg poker device for piercing a hole in a shell of an egg to be boiled to facilitate removal of the shell.

INFORMATION DISCLOSURE STATEMENT

When eggs are boiled for use in the preparation of a salad or when making sandwiches or the like, the removal of the shell from the egg has proved difficult.

Accordingly, egg pokers have been devised for poking a small hole in the shell of an egg prior to boiling the same. The hole in the shell does not interfere with the process of boiling the egg. However, the small hole permits the flow of a small stream of water into the egg for forming a layer between the inner surface of the egg shell and the outer surface of the edible portion of the egg.

Consequently, when the egg has been hard boiled and the egg has been removed from the boiling water, the shell of the egg readily peels away from the white of the egg so that the white of the egg and the yolk therein are not broken or otherwise damaged during such shell peeling operation.

Included in the prior art is an egg poker device which has an egg supporting surface thereon. A central hole is provided for the passage therethrough of a needle. A first member slidably receives therein the supporting surface. The supporting surface includes a depending skirt portion which cooperates with an annular wall of the first member. When the egg is supported on the surface and the egg and supporting surface are pressed downwardly, the point of the needle pierces the shell of the egg.

However, the aforementioned prior art egg poker is relatively complex in construction and requires the provision of a compression spring for urging the support away from the first member.

The egg poker device of the present invention overcomes the problems associated with the prior art device and provides an egg poker of extremely simple construction which greatly reduces the cost of manufacture thereof.

Therefore, it is a primary feature of the present invention to provide an egg poker device that overcomes the aforementioned disadvantages of the prior art devices.

Another feature of the present invention is the provision of an egg poker device that is extremely easy to construct.

A further feature of the present invention is the provision of an egg poker device that is simple to operate and of relatively low cost compared with the prior art arrangements.

Other features and advantages of the present invention will be readily apparent to those skilled in the art by a consideration of the detailed description of a preferred embodiment of the present invention contained herein.

SUMMARY OF THE INVENTION

The present invention relates to an egg poker device for piercing a hole in a shell of an egg to be boiled to facilitate removal of the shell. The device includes a first member having a base and a wall extending away from the base such that the base and the wall define therebetween a cavity. A disc shaped spring is disposed within the cavity and adjacent to the base, the spring having a central portion. The spring also defines a peripheral edge. The first end of a rod is secured to the central portion of the spring and a second end of the rod defines a point for piercing the hole in the shell of the egg. A second member slidably cooperates with the first member. The second member includes a support for supporting the egg, the support defining a hole for the slidable passage therethrough of the point of the rod. A skirt portion extends from the support such that the skirt portion slidably cooperates with the wall. The skirt portion defines a distal end which cooperates with the peripheral edge of the spring. The arrangement is such that in operation of the device, when the the egg to be boiled is supported by the support, the support and the egg supported thereon are moved towards the first member so that the distal end of the skirt is urged against the peripheral edge of the spring for flexing the spring so that the central portion of the spring and the first end of the rod secured thereto are moved towards the egg such that the point passes through the hole in the support for piercing the shell of the egg.

In a more specific embodiment of the present invention, the first member is fabricated from plastics material and is of cup shaped configuration.

Also, the base is of circular configuration and the wall is a peripheral wall.

The spring is fabricated from metal and preferably, the spring is fabricated from a sheet of flexible metallic material, the spring being of saucer shaped configuration so that when the peripheral edge thereof is depressed in a first direction, towards the base, the central portion thereof is deflected in a second direction opposite to the first direction, away from the base.

Furthermore, the rod is fabricated from metal and the second member is fabricated from a plastics material.

Additionally, the second member slides telescopically relative to the first member and the support is of circular configuration.

Moreover, the support defines a depression for the reception thereagainst of the egg and the skirt portion slides within the wall.

More specifically, the skirt portion includes a stop which engages the wall for stopping the second member detaching from the first member.

Also, the distal end of the skirt portion is of annular configuration.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

BRIEF DESCRIPTION OF THE DRAWINGS

Similar reference characters refer to similar parts throughout the various views of the drawings.

DETAILED DESCRIPTION OF THE DRAWINGS

Figure 1:
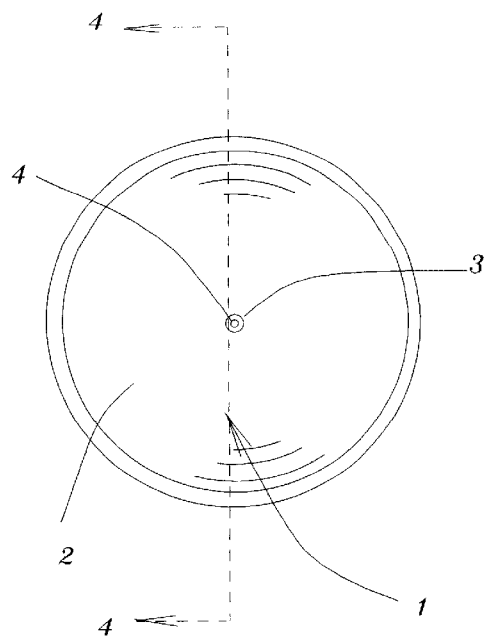
FIG. 1 is a top plan view of a prior art egg poker.

FIG. 1 is a top plan view of a prior art egg poker generally designated 1 having an egg supporting surface 2 thereon. A central hole 3 is shown in FIG. 1 for the passage therethrough of a needle 4.

Figure 2:
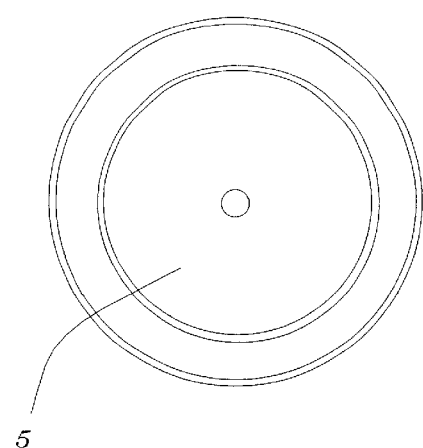
FIG. 2 is a bottom view of the prior art egg poker shown in FIG. 1.

FIG. 2 is a bottom view of the prior art egg poker shown in FIG. 1 showing a first member 5 for slidably receiving therein the supporting surface 2 shown in FIG. 1.

Figure 3:
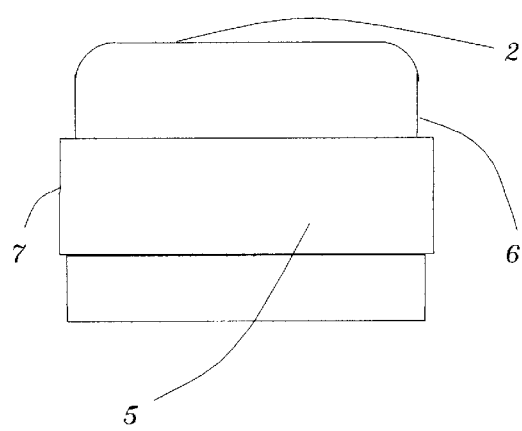
FIG. 3 is a side elevational view of the prior art egg poker shown in FIG. 1.

FIG. 3 is a side elevational view of the prior art egg poker shown in FIG. 1. As shown in FIG. 3, the first member 5 slidably receives the supporting surface 2 which includes a depending skirt portion 6 which cooperates with an annular wall 7 of the first member 5.

Figure 4:
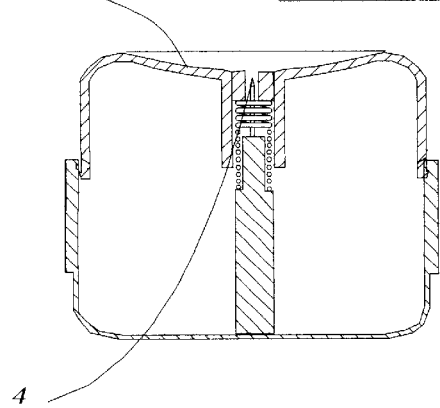
FIG. 4 is a view taken on the line 4—4 of FIG. 1.

FIG. 4 is a view taken on the line 4—4 of FIG. 1. As shown in FIG. 4, when the egg is supported on the surface 2 and the egg and supporting surface are pressed downwardly, the point of the needle 4 pierces the shell of the egg.

The present invention greatly simplifies the arrangement shown in FIGS. 1–4.

Figure 5:
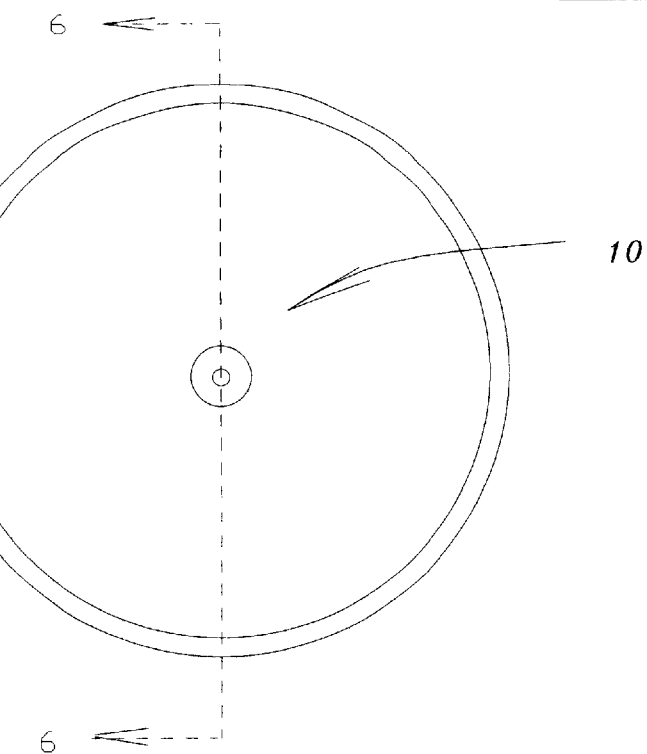
FIG. 5 is a top plan view of an egg poker device according to the present invention.

FIG. 5 is a top plan view of an egg poker device generally designated 10 according to the present invention.

Figure 6:
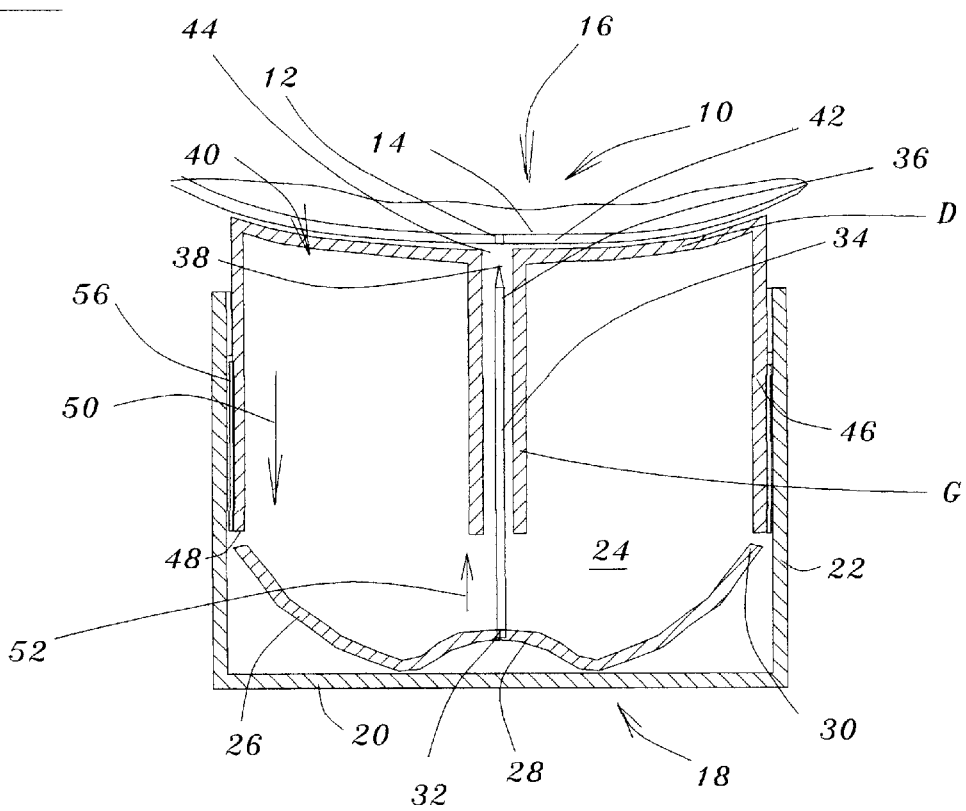
FIG. 6 is a sectional view taken on the line 6—6 of FIG. 5.

FIG. 6 is a sectional view taken on the line 6—6 of FIG. 5. As shown in FIG. 6, the egg poker device 10 is provided for piercing a hole 12 in a shell 14 of a boiled egg generally designated 16 to facilitate removal of the shell 14 therefrom. The device includes a first member generally designated 18 having a base 20 and a wall 22 extending away from the base 20 such that the base 20 and the wall 22 define therebetween a cavity 24. A disc shaped spring 26 is disposed within the cavity 24 and adjacent to the base 20, the spring 26 having a central portion 28. The spring 26 also defines a peripheral edge 30. A first end 32 of a rod 34 is secured to the central portion 28 of the spring 26 and a second end 36 of the rod 34 defines a point 38 for piercing the hole 12 in the shell 14 of the egg 16. A second member generally designated 40 slidably cooperates with the first member 18. The second member 40 includes a support 42 for supporting the egg 16, the support 42 defining a hole 44 for the slidable passage therethrough of the point 38 of the rod 34. A skirt portion 46 extends from the support 42 such that the skirt portion 46 slidably cooperates with the wall 22. The skirt portion 46 defines a distal end 48 which cooperates with the peripheral edge 30 of the spring 26. The arrangement is such that in operation of the device 10, when the boiled egg 16 is supported by the support 42, the support 42 and the egg 16 supported thereon are moved towards the first member 18 so that the distal end 48 of the skirt portion 46 is urged against the peripheral edge 30 of the spring 26 for flexing the spring 26 so that the central portion 28 of the spring 26 and the first end 32 of the rod 34 secured thereto are moved towards the egg 16 such that the point 38 passes through the hole 44 in the support 42 for piercing the shell 14 of the egg 16.

In a more specific embodiment of the present invention, the first member 18 is fabricated from plastics material and is of cup shaped configuration.

Also, the base 20 is of circular configuration and the wall 22 is a peripheral wall.

The spring 26 is fabricated from metal and preferably, the spring 26 is fabricated from a sheet of flexible metallic material, the spring being of saucer shaped configuration so that when the peripheral edge 30 thereof is depressed in a first direction, as indicated by the arrow 50, towards the base 20, the central portion 28 thereof is deflected in a second direction as indicated by the arrow 52 opposite to the first direction 50 away from the base 20.

Furthermore, the rod 34 is fabricated from metal and the second member 40 is fabricated from a plastics material.

Additionally, the second member 40 slides telescopically relative to the first member 18 and the support 42 is of circular configuration.

Moreover, the support 42 may define a depression for the reception thereagainst of the egg 16 and the skirt portion 46 slides within the wall 22.

More specifically, the skirt portion 46 includes a stop 56 which engages the wall 22 for stopping the second member 40 detaching from the first member 18. Also, the distal end 48 of the skirt portion 46 is of annular configuration.

Figure 7:
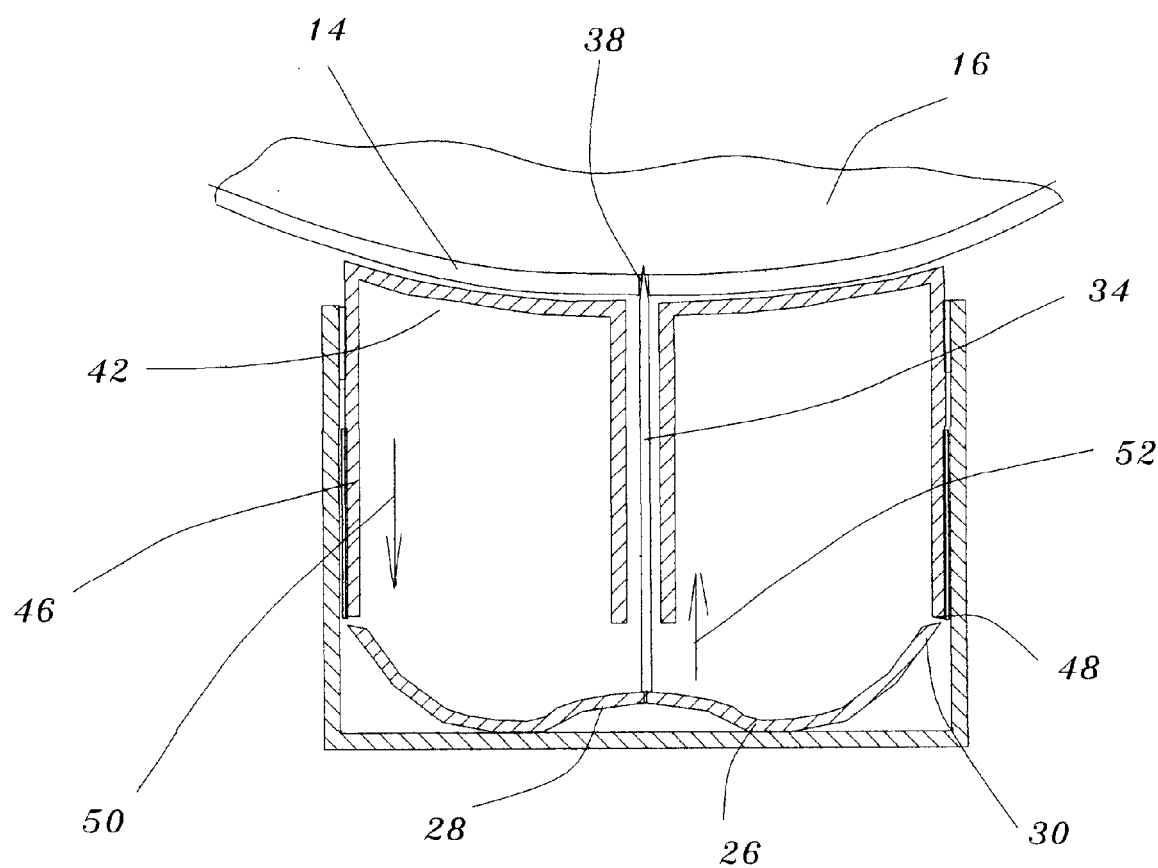
FIG. 7 is a similar view to that shown in FIG. 6 but shows the egg poker device disposed in a disposition for piercing the shell of an egg to be boiled.

FIG. 7 is a similar view to that shown in FIG. 6 but shows the egg poker disposed in a disposition for piercing the shell 14 of an egg 16 to be boiled.

As shown in FIG. 7, when the egg 16 is pressed downwardly against the support 42, the support 42 and skirt portion 46 move downwardly as indicated by arrow 50. The distal end 48 of the skirt portion 46 presses down on the peripheral edge 30 of the spring 26 so that the spring flexes and the central portion 28 thereof moves upwardly as indicated by arrow 52 thus urging the rod 34 and point thereof 38 upwardly for piercing the egg shell 14 so that removal of the egg shell 14 from the boiled egg 16 is facilitated.

The first member 18 including the base 20 and wall 22 are preferably fabricated from #6, polystyrene (PS) molded plastic. The same type of material is also used to fabricate the second member 40. The top of the first member 18 is open like a cup or bowl. The wall 22 is molded with an upper rim to prevent the inner housing or second member 40 from being ejected from the first member 18. The outer or first member 18 is contoured such that the inner housing or second member 40 can fit inside smoothly thus allowing for upward and downward movement of the second member 40.

The rod or needle 34 is of stainless steel or of any other metal or plastic material that could perform the same piercing operation. The needle or rod 34 is attached to the needle spring 26 and the top of the needle is pointed which permits penetration of the egg shell.

The spring 26 is made from a thin sheet of tin or the like which is cut to a size to fit within the first member 18. The spring is formed such that when the outer edges are forced down with a minimum force, the spring at the center will spring upwardly for moving the needle 26 upwardly, the needle being permanently mounted on the spring 26. The second member 40 is compressed into the first member so that when the second member 40 is moved downwardly, the outer rim or distal end 48 presses on the spring 26 such that the center of the spring 26 will pop upwardly for puncturing the shell of the egg.

The support 42 defines a depression D so that the egg comfortably fits onto the support 42. Also, the support 42 includes a depending guide G for guiding the rod or needle 34.

Figure 8:
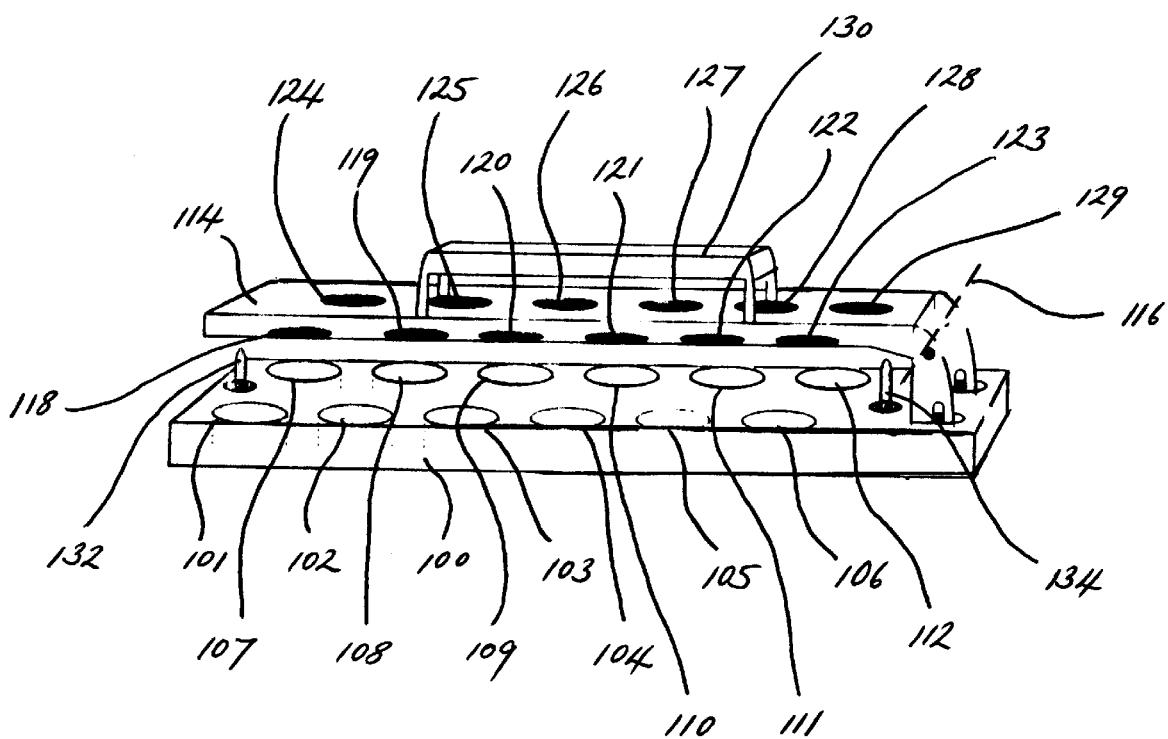
FIG. 8 is a perspective view of an alternative embodiment of the present invention which permits simultaneous piercing of several eggs prior to boiling.

FIG. 8 is a perspective view of a further embodiment of the present invention which permits simultaneous piercing of several eggs prior to boiling. As shown in FIG. 8, a lower deck 100 defines twelve apertures 101, 102, 103,104, 105, 106, 107, 108, 109, 110, 111 and 112 respectively, each aperture such as aperture 101 being arranged for receiving therein one of the devices 10 shown in FIGS. 5–7. The wall 22 of each device 10 is wedged within a corresponding aperture such as aperture 101. Additionally, an upper deck 114 is hinged about axis 116 to the lower deck 100. The underside 118 of the upper deck 114 defines twelve concave surfaces 118, 119, 120, 121, 122, 123, 124, 125, 126, 127, 128 and 129 which are designed respectively to cooperate with twelve eggs (not shown) disposed between the devices 10 and the upper deck 114. A handle 130 is secured to the upper deck 114 so that when the eggs are positioned on each of the twelve devices, the handle 130 is pressed downwardly such that each egg and support 42 are moved downwardly so that point 38 pierces the egg. In this manner, all twelve eggs are able to be pierced in one operation.

Additionally, a pair of stoppers 132 and 134 are provided for limiting the downward movement of the upper deck 114.

The egg poker of the present invention is extremely simple in construction as it consists of only four parts, the first and second members, the spring and the pointed rod thus simplifying construction thereof.

What is claimed is:

1. An egg poker device for piercing a hole in a shell of an egg to be boiled to facilitate removal of the shell, said device comprising:
   a first member including:
      a base;
      a wall extending away from said base such that said base and said wall define therebetween a cavity;
      a disc shaped spring disposed within said cavity and adjacent to said base, said spring having a central portion, said spring defining a peripheral edge;
      a rod having a first and a second end, said first end of said rod being secured to said central portion of said spring, said second end of said rod defining a point for piercing the hole in the shell of the egg;
   a second member slidably cooperating with said first member;
   said second member including:
      a support for supporting the egg, said support defining a hole for the slidable passage therethrough of said point of said rod;
      a skirt portion extending from said support such that said skirt portion slidably cooperates with said wall; and
         said skirt portion defining a distal end which cooperates with said peripheral edge of said spring, the arrangement being such that in operation of said device, when the egg to be boiled is supported by said support, said support and the egg supported thereon are moved towards said first member so that said distal end of said skirt is urged against said peripheral edge of said spring for flexing said spring so that said central portion of said spring and said first end of said rod secured thereto are moved towards the egg such that said point passes through said hole in said support for piercing the shell of the egg.

2. An egg poker device as set forth in claim 1 wherein said first member is fabricated from plastics material.

3. An egg poker device as set forth in claim 1 wherein said first member is of cup shaped configuration.

4. An egg poker device as set forth in claim 1 wherein said said base is of circular configuration.

5. An egg poker device as set forth in claim 1 wherein said said wall is a peripheral wall.

6. An egg poker device as set forth in claim 1 wherein said said spring is fabricated from metal.

7. An egg poker device as set forth in claim 1 wherein said said spring is fabricated from a sheet of flexible metallic material, said spring being of saucer shaped configuration so that when said peripheral edge thereof is depressed in a first direction, towards said base, said central portion thereof is deflected in a second direction opposite to said first direction away from said base.

8. An egg poker device as set forth in claim 1 wherein said rod is fabricated from metal.

9. An egg poker device as set forth in claim 1 wherein said second member is fabricated from a plastics material.

10. An egg poker device as set forth in claim 1 wherein said said second member slides telescopically relative to said first member.

11. An egg poker device as set forth in claim 1 wherein said support is of circular configuration.

12. An egg poker device as set forth in claim 1 wherein said support defines a depression for the reception thereagainst of the egg.

13. An egg poker device as set forth in claim 1 wherein said said skirt portion slides within said wall.

14. An egg poker device as set forth in claim 1 wherein said skirt portion includes:
   a stop which engages said wall for stopping said second member detaching from said first member.

15. An egg poker device as set forth in claim 1 wherein said distal end of said skirt portion is of annular configuration.

* * * * *